(12) United States Patent
Ye et al.

(10) Patent No.: US 9,590,934 B2
(45) Date of Patent: Mar. 7, 2017

(54) METHOD AND SYSTEM OF CREATING A GRAYLIST FOR MESSAGE TRANSMISSION

(71) Applicant: Alibaba Group Holding Limited, Grand Cayman (KY)

(72) Inventors: Bin Ye, Hangzhou (CN); Jiayong Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 42 days.

(21) Appl. No.: 13/739,907

(22) Filed: Jan. 11, 2013

(65) Prior Publication Data

US 2013/0185367 A1    Jul. 18, 2013

(30) Foreign Application Priority Data

Jan. 17, 2012    (CN) .......................... 2012 1 0014885

(51) Int. Cl.
*G06F 15/16*    (2006.01)
*H04L 12/58*    (2006.01)
(Continued)

(52) U.S. Cl.
CPC ......... *H04L 51/12* (2013.01); *G06Q 30/0241* (2013.01); *G06Q 30/0242* (2013.01); *G06Q 30/0251* (2013.01); *G06Q 30/0254* (2013.01); *G06Q 30/0261* (2013.01); *G06Q 30/0277* (2013.01); *H04L 51/34* (2013.01); *H04W 4/12* (2013.01); *G06Q 10/107* (2013.01); *G06Q 30/02* (2013.01); *H04L 51/18* (2013.01)

(58) Field of Classification Search
CPC ........... G06Q 30/0251; G06Q 30/0261; G06Q 30/0241; G06Q 30/0242; G06Q 30/0277; G06Q 30/0254

USPC ......................................................... 709/206
See application file for complete search history.

(56) References Cited

U.S. PATENT DOCUMENTS 6,868,395 B1 *  3/2005  Szlam et al. ............... 705/26.82
8,510,773 B1 *  8/2013  Abou-Rizk et al. ............ 725/34
(Continued)

FOREIGN PATENT DOCUMENTS

CN       101026802 A       3/2007
CN       101291470         6/2008
(Continued)

OTHER PUBLICATIONS

PCT Search Report mailed Apr. 19, 2013 for PCT application No. PCT/US13/21271, 17 pages.
(Continued)

*Primary Examiner* — Chirag R Patel
*Assistant Examiner* — Rachel J Hackenberg
(74) *Attorney, Agent, or Firm* — Lee & Hayes, PLLC

(57) ABSTRACT

Techniques for text message transmission are described herein. These techniques may include collecting multiple user IDs for electronic commerce. Using the user IDs, a server transmits a text message to multiple clients, and obtains activities of particular clients of the multiple clients in response to the text message to determine particular user IDs associated with the particular clients. Based on the obtained activities, the server generates and/or updates a graylist that includes one or more user IDs of the multiple user IDs different from the particular user IDs.

17 Claims, 4 Drawing Sheets

(51) Int. Cl.
*G06Q 30/02* (2012.01)
*H04W 4/12* (2009.01)
*G06Q 10/10* (2012.01)

(56) References Cited

U.S. PATENT DOCUMENTS

| | | |
|---|---|---|
| 2002/0082923 A1 | 6/2002 | Merriman et al. |
| 2003/0023692 A1 | 1/2003 | Moroo |
| 2006/0031333 A1 | 2/2006 | O'Neill |
| 2008/0109845 A1* | 5/2008 | Hengel .................. G06Q 30/02 725/36 |
| 2009/0132665 A1* | 5/2009 | Thomsen ............. G06Q 10/107 709/206 |
| 2009/0247193 A1* | 10/2009 | Kalavade ................... 455/456.3 |
| 2009/0300546 A1 | 12/2009 | Kwok et al. |
| 2010/0217774 A1* | 8/2010 | Marshall ....................... 707/769 |
| 2010/0280908 A1 | 11/2010 | Benz et al. |
| 2011/0145057 A1 | 6/2011 | Jones et al. |
| 2011/0171933 A1 | 7/2011 | Liu et al. |
| 2011/0289153 A1 | 11/2011 | Hull et al. |
| 2012/0041824 A1 | 2/2012 | Choi et al. |
| 2012/0124144 A1 | 5/2012 | Woley et al. |
| 2012/0259928 A1 | 10/2012 | Deshpande et al. |
| 2012/0323959 A1* | 12/2012 | O'Sullivan et al. .......... 707/769 |
| 2013/0110949 A1 | 5/2013 | Maurel et al. |

FOREIGN PATENT DOCUMENTS

| | | |
|---|---|---|
| JP | 2002032552 A | 1/2002 |
| JP | 2008192144 A | 8/2008 |
| WO | WO0127765 | 4/2001 |
| WO | WO0155892 A1 * | 8/2001 ............. G06Q 30/02 |

OTHER PUBLICATIONS

European Office Action mailed Aug. 6, 2015 for European patent application No. 13707728.5, a counerpart foreign application of U.S. Appl. No. 13/739,907, 11 pages.

Translated Chinese Office Action mailed Jan. 29, 2015 for Chinese patent application No. 201210014885.1, 7 pages.

European Office Action mailed Aug. 25, 2016 for European patent application No. 13707728.5, a counterpart foreign application of U.S. Appl. No. 13/739,907, 9 pages.

Japanese Office Action mailed Dec. 27, 2016 for Japanese Patent Application No. 2014-552339, a counterpart foreign application of U.S. Appl. No. 13/739,907, 6 pages.

* cited by examiner

METHOD AND SYSTEM OF CREATING A GRAYLIST FOR MESSAGE TRANSMISSION

CROSS REFERENCE TO RELATED PATENT APPLICATIONS

This application claims priority to Chinese Patent Application No. 201210014885.1, filed on Jan. 17, 2012, entitled "Method and System of Creating Graylist, and Method and System of Sending Short Message," which is hereby incorporated by reference in its entirety.

TECHNICAL FIELD

This disclosure relates to the field of mobile communication. More specifically, the disclosure relates to message transmission.

BACKGROUND

Text messages are used to interact with automated systems to provide information (e.g., news and special offers) to receivers and to engage them with certain activities (e.g., voting and surveys). Using text messages, service providers can notify mobile phone users about promotions, payment due dates and other notifications that were sent by a post, e-mail or voicemail. For example, advertisers may use text messages to promote a business, product, and/or service. However, under conventional technologies, advertisers have problems evaluating whether their text messages are effective with respect to certain users and whether there is a need to send additional text messages to these users.

SUMMARY

Described herein are techniques for messaging. The techniques may generate a graylist that includes multiple user IDs associated with an item category for electronic commerce. Based on the graylist, a text message may be transmitted to a client associated with a user ID that is not included in the graylist. This Summary is not intended to identify all key features or essential features of the claimed subject matter, nor is it intended to be used alone as an aid in determining the scope of the claimed subject matter.

BRIEF DESCRIPTION OF THE DRAWINGS

The Detailed Description is described with reference to the accompanying figures. The use of the same reference numbers in different figures indicates similar or identical items.

DETAILED DESCRIPTION

The discussion below describes specific exemplary embodiments of the present disclosure. The exemplary embodiments described here are for exemplary purposes only, and are not intended to limit the present disclosure.

Figure 1:
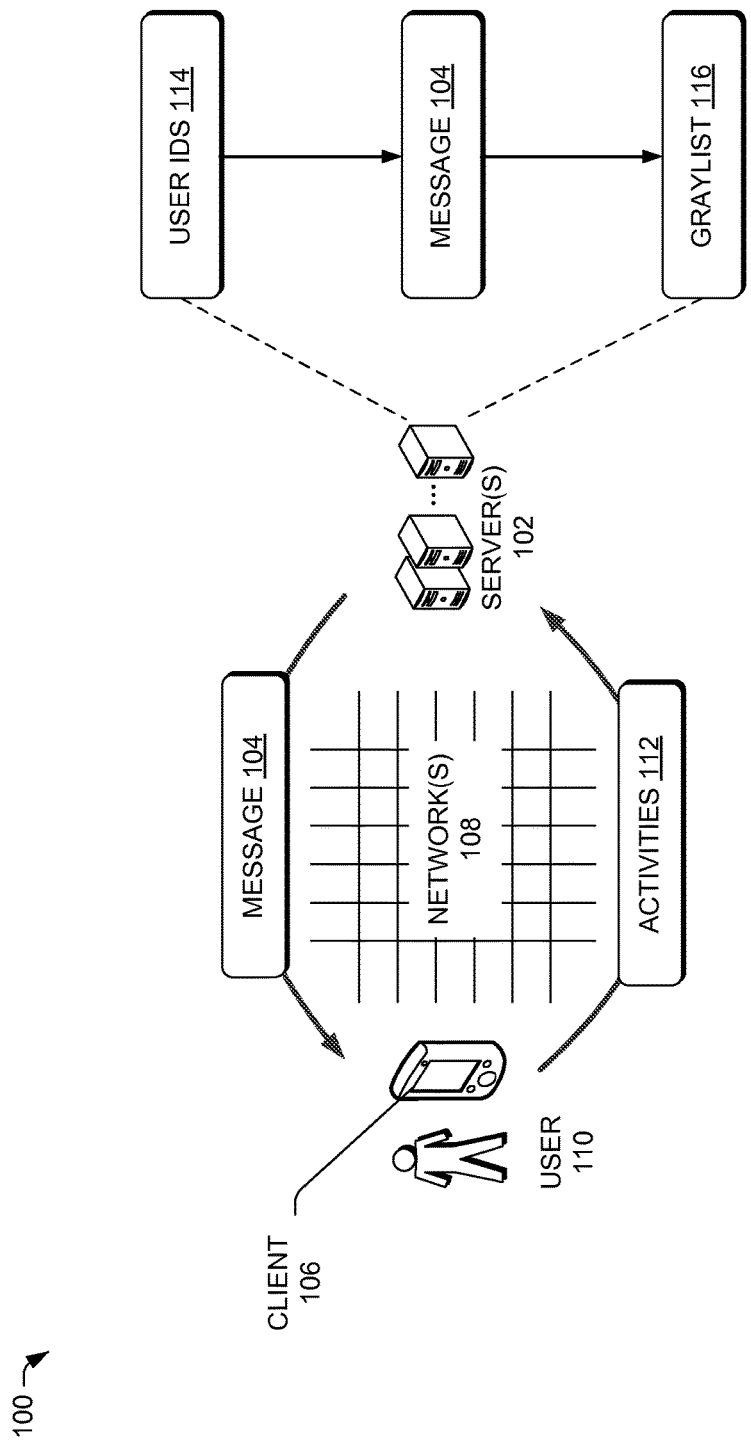
FIG. 1 illustrates an example architecture that includes server(s) for performing graylist generation and/or message transmission.

FIG. 1 illustrates an example architecture 100 that includes server(s) for performing graylist generation and/or message transmission. A server generates a message (e.g., a text message) and transmits the message to a client (e.g., a user device) associated with a user identifier (ID). The message may be associated with an item category (e.g., food, books and electronics) for electronic commerce. The server determines a graylist corresponding to the item category, and then determines whether the user ID is included in the graylist. If the user ID is not included in the graylist, the server may transmit the message to the client. The graylist may be determined based on how a previously transmitted message has been responded to in a predetermined time period by users associated with multiple user IDs, wherein the message is associated with the item category.

In the illustrated embodiment, the techniques are described in the context of one or more servers 102 which generate a message 104 (e.g., a text message) and transmit the message 104 to a client 106 (e.g., a user device) over one or more network(s) 108. In response to the message 104, the user 110 may operate the client 106, for example, to open the message 104 and click a link if included in the message. These activities (i.e., activities 112) may obtained and analyzed by the server 102 to generate a graylist 116 including users who fail to response to the message in a predetermined time and/or fail to response the message 104 predetermined times.

Here, the server 102 may collect the activities 112 via the network 108. The network 108 may include any one or combination of multiple different types of networks, such as cable networks, the internet, and wireless networks. The client 106, meanwhile, may be implemented as any number of computing devices, including as a personal computer, a laptop computer, a portable digital assistant (PDA), a mobile phone, a set-top box, a game console, a personal media player (PMP), and so forth. The client 106 is equipped with one or more processors and memory to store applications and data. An application, such as a browser or other client application, running on the server 102 may facilitate message transmission to the client 106 over network 108.

In architecture 100, the server 102 may collect user IDs 114 associated with multiple clients. Based on the user IDs 114, the server 102 may generate and transmit the message 104 to the client 106. The message may be a text message using a Short Message Service (SMS). In some embodiments, the message 104 is a text message and includes a link leading to a Wireless Application Protocol (WAP) address. In these instances, the server 102 may generate a parameter based on the user IDs 114 and embed the parameter into the link such that the server 102 may obtain the activities 112 of the message receiver (e.g., the user 110). For example, using the parameter, the server may be able to determine whether the user 110 opens the message and clicks the link.

In some embodiments, the link may be associated with an item category for electronic commerce. In these instances, the server 102 may transmit a classified text message to a client associated with a user ID, and the classified text message includes a link leading to an electronic commerce website listing an item that belongs to the item category. The server 102 may then associate the user ID with the item category if the server determines that the link is clicked on behalf of the user ID. In some embodiments, the user ID may be associated with various item categories.

In the illustrated embodiment, after generating the message 104, the server 102 may generate and/or update a graylist 116 corresponding to an item category that is associated with the ID of the user 110. The generation of the graylist 116 is discussed in greater detail in FIG. 2. Base on the graylist 116, the server 102 may transmit the message 104 to the multiple clients associated with the user IDs 114.

Figure 2:
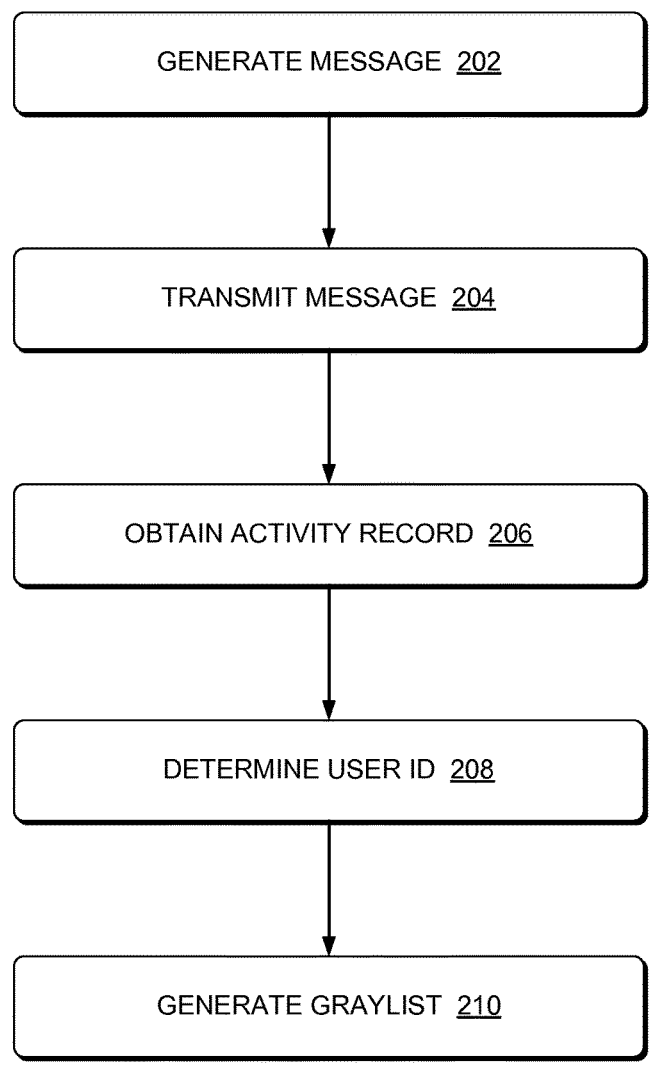
FIG. 2 illustrates an example flow diagram for generating a graylist.

FIG. 2 illustrates an example flow diagram for generating a graylist 116. At 202, the server 102 may generate the message 104. In some embodiments, the server 102 may collect multiple user IDs and generate the message 104 based on the multiple user IDs. In some instances, the message 104 may be a text message using a SMS. The text message may include a link leading to a WAP address associated with an item for electronic commerce. The link may include a parameter that enables the server 102 to obtain user activity records associated with the user IDs 114. The link may be associated with an item category that the item belongs to.

At 204, the server 102 may transmit the message 104 to multiple clients (e.g., the client 106) associated with the user IDs 114. At 206, the server 102 may obtain the user activity records of particular clients of the multiple clients in response to the message 104. Then, the server 102 may determine particular user IDs associated with the particular clients at 208. In some embodiments, the activity records may include activity streams listing a multiple activities that are performed by users associated with the particular user IDs in response to the message 104. In these instances, the activities may be performed on behalf of the particular user IDs on a website in a predetermined time period. In some embodiments, the server 102 may retransmit the message 104 to certain clients of which activity records are not obtained. In these instances, the server 102 may retransmit the message 104 in a predetermined time period or with a predetermined frequency within a predetermined time period.

At 210, the server 102 may generate a graylist 116 including one or more user IDs of the user IDs 114, wherein the one or more user IDs are different from the particular user IDs that are previously determined by the server 102 based on the activity records in response to the message 104.

In some embodiments, a service provider may send information about promotional items or data gathering information to a user via a client. And since the information contained in a text message is limited, not all of the information can be sent directly to the client using the text message. In some instances, a network link can be included in a text message, wherein this link information corresponds to the information that needs to be sent to the client.

After the necessary information has been sent to the client via the network link information, the network link information may include related parameters that are used to record the user ID information or operating records. The parameters may enable the server 102 to calculate the client's recorded operating information towards the text messages. Thus, after the user receives the text message, the user's operating behavior can be calculated. In addition, the ID information of the users to whom the text messages have been sent can be pre-recorded in the client.

In some embodiments, the related parameters that are used to record the user ID information or operating records can be in the form of embedded monitor and control parameters. When the user that corresponds to the client opens the network link in the text message, the embedded monitor and control parameters may enable the server 102 to record the operating information of the user (that corresponds to the client), and the ID information of the corresponding client.

In some embodiments, the ID information of the client may be recorded locally. In some embodiments, the ID information may be recorded by a server that corresponds to a third-party link. In these instances, there may not be a need to use the resources of the client, since most third-party servers are stable enough. In some embodiments, the ID information may be recorded in the server (e.g., the server 102) that sends the text messages and categorizes the clients. These embodiments may not use or may use less resources of the client, and are stable and convenient to transfer/process the data.

In some embodiments, the server 102 may send the text message containing the network link information to all the user groups; however, under normal circumstances, most clients may be only interested in specific content. For example, they may only be interested in certain types of products (e.g., electronics, food/cuisine and wardrobe/clothes). In addition, some users are only interested in electronics, while some are only interested in food/cuisine. Thus, if all the users are placed in one group and the text messages are sent to all of them, resources are wasted. Accordingly, the server 102 may generate text messages containing different types of network link information for different user groups, and send them to different client groups.

In addition, the server 102 may categorize users based on their demographics and then associate a user with a user group corresponding to her/his demographics. For example, because students may be more interested in clothes they are placed in the client group under the wardrobe category; however, because seniors may be more interested in food they are placed in the client group under the food category. In some embodiments, the server 102 may categorize a user and/or update the certain user's user group information in a predetermined time period or triggering event. For example, the server 102 may first send all categories of text messages to all the clients in the system. However, if the server 102 determines that users A and B are only interested in electronics, the server 102 may add them to the electronics user group.

In some embodiments, the server 102 may obtain the client's text message operating records that correspond to text messages, wherein each text message operating record contains information on whether or not the corresponding client has opened the network link in the text message, and ID information that corresponds to the client. In these instances, when sent to the user with a text message, the network link information contains the recorded user ID information or operating record parameters. Therefore, when the user who receives the text message opens the network link in the text message, the related parameters that are based on recording the user ID information or operating record may enable the server 102 to obtain the user's operating record towards the text message. The operating record can include the ID information of the client and other information, such as, the length of time that the client spent in the webpage, refresh frequencies etc., while the ID information of the client can be the user ID associated with the client, or cell phone number, etc.

Based on the text message operating record, the server 102 may determine the ID information of the users that did not open the network link in the text message. In some embodiments, the ID information of the user has been pre-recorded when sending the text message to the user. Thus, if the user opens the network link in the text message, the related parameters that are based on the text message link information may enable the server 102 to record the user opening the network link and the ID information of the user.

In some embodiments, within a predefined time, for example, within 2, 3 or any number of days after the text message has been sent, the server 102 may obtain the text message operating record that corresponds to the text message obtained by the user. In this way, the server 102 may determine, within a predefined time, the ID information of the users that did not open the network link in the text message. If the users did not open the network link because the clients associated with the users do not support WAP network, the corresponding users are not interested in the network link information in the text message, etc. And in general, if the users did open the network link information in the text message within the predefined time, the likelihood of opening the network information after the predefined time is low. Therefore, users that did not open the network link information in the text message within the predefined time may be considered to be users that did not open the network link information in the text message.

In some embodiments, the network link information in the text message contains both the wardrobe category network link information and the food category network link information. But after the users receive the text message, based on the users' operating records, the server 102 may determine that some users only open the wardrobe network link information.

In some embodiments, a graylist 116 may include the users in the list of users that did not open the network link information in the text message after it did not open the network link information once. In addition, the graylist 116 may also include the users in the list of users that did not open the network link information in the text message only after it did not open the network link information several times. In these instances, a counter can be assigned to individual users. If the user did not open the network link information, the server 102 adds 1 to the counter; while if the user opened the network link information, the server 102 resets the counter to 0. If the ID information of the user is greater than a predefined threshold value (e.g., 3, which means that the user did open the network link information in the text message 3 times), the server 102 may consider the user as a user that did not open the network link information in the text message. In some embodiments, if the ratio between the number of times that the user opened the network link and the total number of text message sent to the user is smaller than a threshold value, the server 102 may add the user into the gray list.

Figure 3:
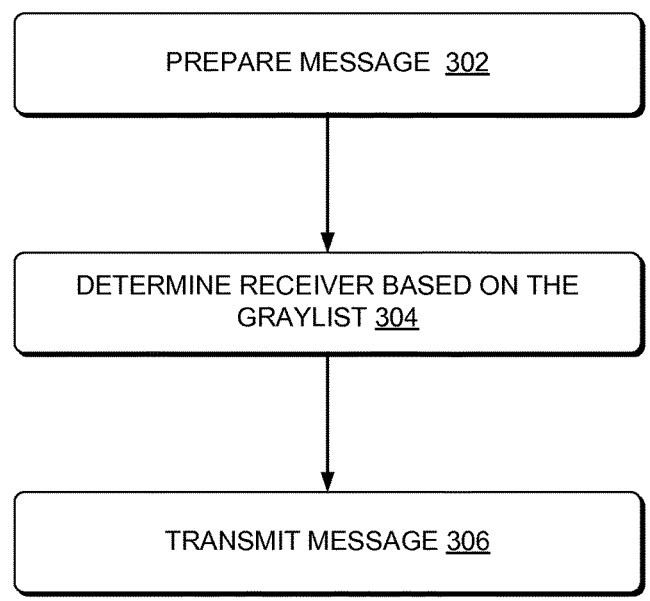
FIG. 3 illustrates an example flow diagram for transmitting a message using a graylist.

FIG. 3 illustrates an example flow diagram 300 for transmitting a message using a graylist 116. At 302, the server 102 may generate a message for multiple clients associated with multiple user IDs. The message may include information associated with an item category for electronic commerce. The message may also be a text message using SMS.

At 304, the server 102 may determine receivers of the message based on a graylist 116 generated using operations similar to those discussed in FIG. 2. In some embodiments, the server 102 may determine a graylist 116 corresponding to the item category, and generate a receiver list by removing user IDs of the graylist 116 from the multiple user IDs. At 306, the server 102 may transmit the message to clients associated with user IDs of the receiver list.

In some embodiments, the server 102 sends product information or advisory information to a client. The server 102 first composes the text message contents using a text message template, and then selects the client groups to whom the text message will be sent, or the ID information of the client. In these instances, client groups to whom the text message will be sent can be all the clients, or clients selected based on a defined criteria. For example, based on the different network link information in the text message, the server 102 may select different clients. If the network link information consists of general goods information, then the target clients are mainly those of housewives; if the network link information consists of leisure and entertainment information, then the target clients are mainly those of students.

In some embodiments, the server 102 may focus on different network link categories in the several text messages to select the users from different graylists 116. For example, some text messages include general goods information, then the users to whom these text messages will be sent will only be those that use general goods information, which are the housewives; hence, during selection, it can directly go to the user groups under the housewives category to remove the users that are under the graylist 116. If the network link category in the text messages refers to entertainment information, the server 102 may directly send the text messages to the user groups that use the entertainment information, and therefore only remove from the graylist 116 the users that are under the student user.

Figure 4:
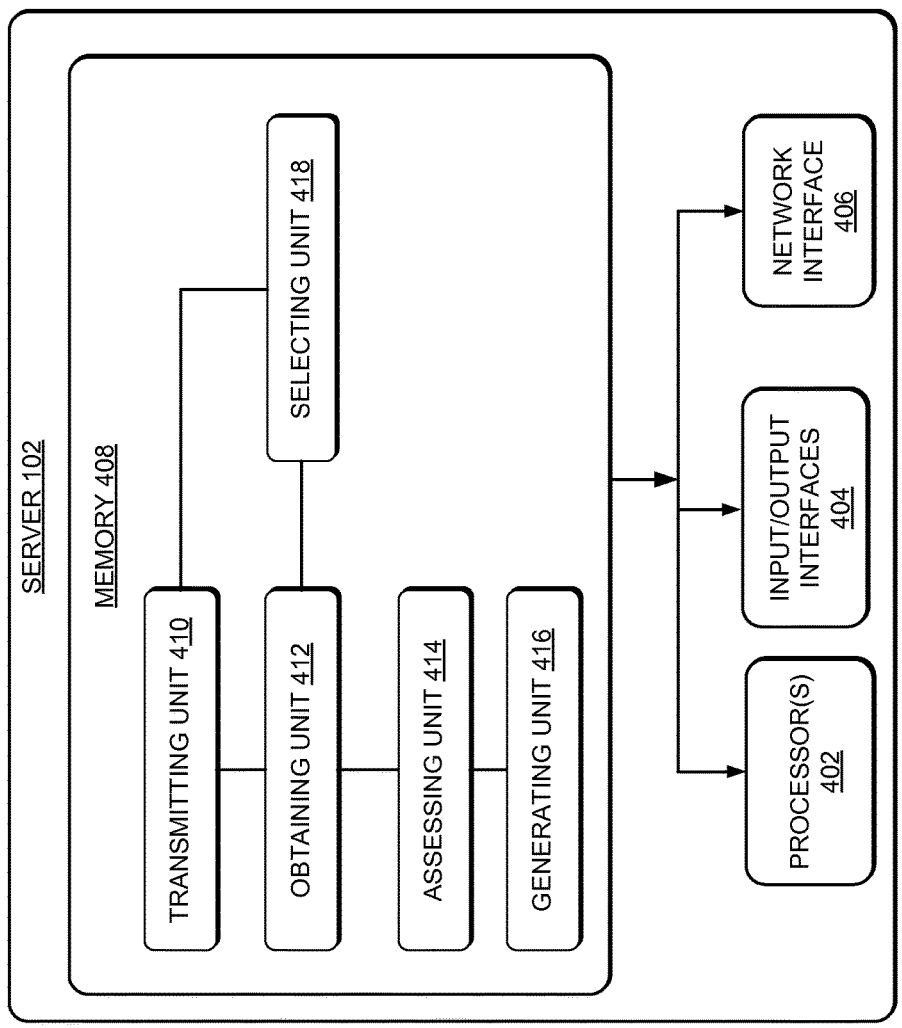
FIG. 4 illustrates an example server that may be deployed in the architecture of FIG. 1

FIG. 4 illustrates an example server 102 that may be deployed in the architecture of FIG. 1. The server 102 may be configured as any suitable computing device(s). In one exemplary configuration, the server 102 includes one or more processors 402, input/output interfaces 404, network interface 406, and memory 408.

The memory 408 may include computer-readable media in the form of volatile memory, such as random-access memory (RAM) and/or non-volatile memory, such as read only memory (ROM) or flash RAM. The memory 408 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

Turning to the memory 408 in more detail, the memory 408 may include a transmitting unit 410, an obtaining unit 412, an assessment unit 414, a generating unit 416, and a selecting unit 418.

The transmitting unit 410 may transmit a text message containing the network link information to several users. The obtaining unit 412 may obtain the user's text message operating records that correspond to the said text message, wherein each text message operating record contains information on whether or not the corresponding user has opened the network link in the text message, and the ID information that corresponds to the user. The assessment unit 414 may, based on the text message operating record, determine the ID information of the users that did not open the network link information in the said text message.

In some embodiments, the assessment unit 414 may include first obtaining module that in a predefined time period, obtain the ID information of the users that opened the network link information from among the several users. The assessment unit 414 may also include a second obtaining module that may obtain the ID information of the users that did not opened the network link information and the recorded ID information of several users.

The generating unit 416 that generates and/or updates a graylist 116 by adding the ID information of the users that did not open the network link in the text message into the graylist 116.

The selecting Unit 418 may, based on the graylist 116, remove the ID information of the users that belong to the graylist 116 from the ID information of the users waiting to send the text message, and therefore obtain the ID information of the users waiting to send the text message; the said graylist 116 is constructed using the above method for constructing the graylists 116. The selecting unit 418 may include an obtaining module that obtains the ID information of the users that corresponds to the network link information in the text message. The selecting unit 418 may also include a removal module that, based on the ID information of the users, removes the ID information of the users in the graylist 116 that corresponds to the network link information.

The specific examples herein are utilized to illustrate the principles and embodiments of the application. The description of the embodiments above is designed to assist in understanding the method and ideas of the present disclosure. However, persons skilled in the art could, based on the ideas in the application, make alterations to the specific embodiments and application scope, and thus the content of the present specification should not be construed as placing limitations on the present application.

What is claimed is:

1. One or more non-transitory computer-readable media storing computer-executable instructions that, when executed by one or more processors, instruct the one or more processors to perform acts comprising:

transmitting a message to multiple clients associated with multiple user identifiers (IDs), respectively, the message containing a parameter embedded in a link by which a response to the message by any of the multiple clients is trackable to identify which of the multiple clients respond, such that the parameter of the message causes a client computing device to record an operating record with respect to the message;

obtaining respective response activity records of particular clients as a subset of the multiple clients in response to the message to determine particular user IDs associated respectively with the subset of particular clients;

generating a graylist including one or more user IDs of the respective multiple user IDs, each of the one or more user IDs of the respective multiple user IDs in the graylist being different from each of the particular user IDs and identifying the clients for whom a determination is made that a ratio of a number of times the respective clients did respond to the message to a total number of times the message has been sent is smaller than a threshold value; and transmitting a further message to a portion of the multiple clients associated with multiple user IDs, the further message being associated with an item category corresponding to the graylist, and the portion of the multiple clients including the multiple clients associated with the multiple user IDs except the clients identified in the graylist.

2. The one or more computer-readable media of claim 1, wherein the message is a text message using a Short Message Service (SMS).

3. The one or more computer-readable media of claim 1, wherein the message is a text message including the link, which is a link to a Wireless Application Protocol (WAP) address.

4. The one or more computer-readable media of claim 3, wherein the link is associated with the item category for electronic commerce.

5. The one or more computer-readable media of claim 1, wherein the obtaining the activity records comprises obtaining the activity records using the parameter.

6. The one or more computer-readable media of claim 1, wherein the acts further comprise:

transmitting a classified text message to a client associated with a user ID, the classified text message including the link, which is a link associated with the item category, and associating the user ID with the item category if a response to the classified text message is received.

7. The one or more computer-readable media of claim 1, wherein the activity records include activity streams listing a plurality of activities that are performed by users associated with particular user IDs in response to the message.

8. The one or more computer-readable media of claim 7, wherein the plurality of activities are on a website in a predetermined time period.

9. The one or more computer-readable media of claim 1, wherein the acts further comprise retransmitting the message until the total number of times is reached.

10. A computer-implemented method comprising:

generating, by a server, a message associated with an item category for electronic commerce to be sent to multiple clients associated with multiple user IDs, respectively, the message containing a parameter embedded in a link by which a response to the message by any of the multiple clients is trackable to identify which of the multiple clients respond, such that the parameter of the message causes a client computing device to record an operating record with respect to the message;

determining, by the server, a graylist corresponding to the item category that includes a user ID among a plurality of user IDs, the graylist being generated based on non-performance of any of a plurality of activities on behalf of the user ID in response to the message associated with the item category, the non-performance identifying the clients for whom a determination is made that a ratio of a number of times the respective clients did respond to the message to a total number of times the message has been sent is smaller than a threshold value;

transmitting, by the server, the message to the multiple clients associated, respectively, with the multiple user IDs of the plurality of user IDs; and transmitting a further message to a portion of the multiple clients associated with multiple user IDs, the further message being associated with an item category corresponding to the graylist, and the portion of the multiple clients including the multiple clients associated with the multiple user IDs except the clients identified in the graylist.

11. The computer-implemented method of claim 10, wherein each of the multiple user IDs is different from the user ID.

12. The computer-implemented method of claim 10, wherein the message is a text message including the link, which is a link to a WAP address.

13. The computer-implemented method of claim 10, wherein the graylist is generated by:
the transmitting the message to the multiple clients associated with the multiple user IDs, respectively;
obtaining respective response activities of particular clients as a subset of the multiple clients in response to the message to determine particular user IDs associated respectively with the particular clients; and
generating the graylist including one or more user IDs of the respective multiple user IDs, each of the one or more user IDs of the respective multiple user IDs in the graylist being different from each of the particular user IDs.

14. A computing device comprising:
one or more processors; and
memory to maintain a plurality of components executable by the one or more processors, the plurality of components including:
a transmitting unit configured to transmit a text message to multiple clients associated with multiple user IDs, respectively, the text message containing a parameter embedded in a link by which a response to the text message by any of the multiple clients is trackable to identify which of the multiple clients respond, such that the parameter of the text message causes a client computing device to record an operating record with respect to the text message,
an obtaining unit configured to obtain respective response activities of a subset of particular clients of the multiple clients in response to the text message,
an assessing unit configured to determine particular user IDs associated, respectively, with the subset of particular clients, and
a generating unit configured to add one or more user IDs of the respective multiple user IDs to a graylist, the one or more user IDs of the respective multiple user IDs being different from the particular user IDs, and the graylist identifying the clients for whom a determination is made that a ratio of a number of times the clients did respond to the message to a total number of times the message has been sent is smaller than a threshold value,
wherein the transmitting unit is further configured to transmit a further message to a portion of the multiple clients associated with multiple user IDs, the further message being associated with an item category corresponding to the graylist, and the portion of the multiple clients including the multiple clients associated with the multiple user IDs except the clients identified in the graylist.

15. The computing device of claim 14, wherein the text message includes the link, which is a link to a WAP address and the link is associated with the item category for electronic commerce.

16. The computing device of claim 14, wherein the text message is retransmitted until the total number of times is reached.

17. The computing device of claim 14, wherein the activities are performed on behalf of the particular user IDs on a website in a predetermined time period.

* * * * *